UNITED STATES PATENT OFFICE.

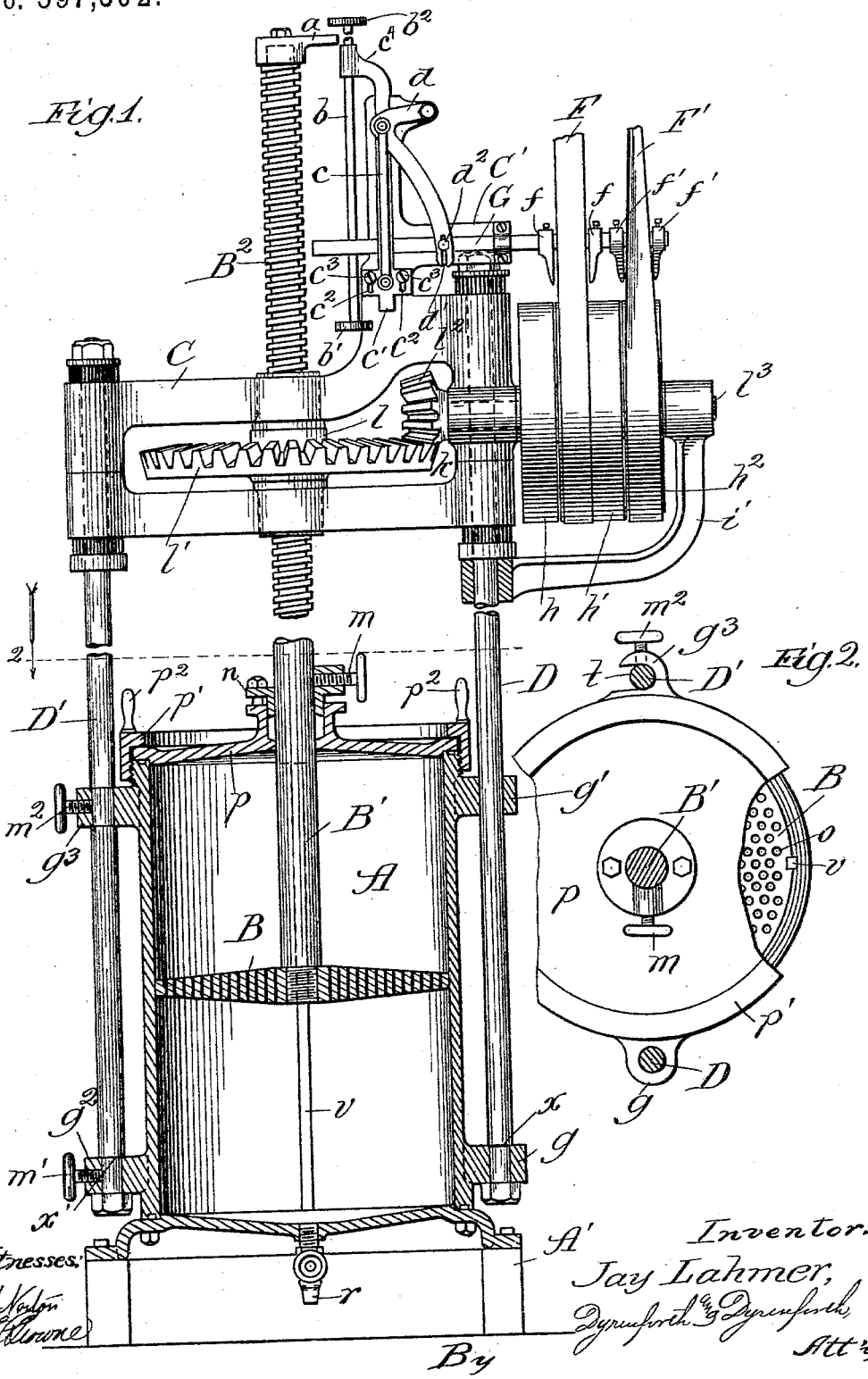

JAY LAHMER, OF CHICAGO, ILLINOIS.

APPARATUS FOR MAKING PERFUMERY.

SPECIFICATION forming part of Letters Patent No. 597,502, dated January 18, 1898.

Application filed January 23, 1897. Serial No. 620,462. (No model.)

*To all whom it may concern:*

Be it known that I, JAY LAHMER, a citizen of the Dominion of Canada, residing at Chicago, in the county of Cook and State of Illinois, have invented a new and useful Improvement in Apparatus for the Manufacture of Perfumery, of which the following is a specification.

The manufacturer of liquid perfumery obtains his material in the form of a pomatum, being a grease impregnated with the odor acquired from a particular flower or other source, and to extract from this grease the odor which permeates it he treats it with alcohol, which rapidly absorbs the odor, by working the grease in an alcohol-bath to bring, as far as possible, every particle of the grease into contact with the alcohol.

The object of my invention is to improve the method referred to of extracting the odor from the perfumed grease by working the latter, in a bath of alcohol, into more or less finely divided strands, thereby more thoroughly and expeditiously than has heretofore been done effecting absorption from the grease of the odor; and my further object is to provide an improved construction of machine for thus working the odor-impregnated grease in the alcohol-bath.

Referring to the accompanying drawings, Figure 1 shows my improved machine by a broken view in sectional elevation, and Fig. 2 is a section taken at the line 2 on Fig. 1 and viewed in the direction of the arrow.

A is a receptacle, shown in its preferred form of a cylinder, supported in upright position on a suitable base A' and having a valve-controlled outlet-spout $r$ extending from its bottom and a removable cover $p$, fastened in place by a clamping-ring $p'$, screwed upon the upper end of the cylinder, the ring being provided with handles $p^2$, projecting from near the peripheral edge conveniently for manipulation in loosening and tightening it to release and fasten down the cover. Within the cylinder is the plunger B, having let into its periphery a vertical guide $v$, projecting from the inner side of the cylinder, the plunger containing numerous perforations $o$ and having a stem B', extending upward from it through a stuffing-box $n$, in which it is fastened to steady it by a set-screw $m$. The stem B has a worm extension $B^2$, which passes through a rotary nut $l$, confined in a head C, having a horizontal slot $k$, in which is accommodated a beveled gear-wheel $l'$ on the nut engaged by a beveled pinion $l^2$ on a rotary shaft $l^3$, journaled in the head and, at its outer end, in a bracket $i$, the shaft carrying the belt-pulleys $h$, $h'$, and $h^2$.

The head C, with the mechanism carried by it, is supported on the receptacle A by a vertical rod D, which passes loosely through perforated ears $g$ and $g'$, extending in vertical alinement with each other from a side of the receptacle and on the lower of which the rod seats at its shoulder $x$. A similar rod D' depends from the head C in alinement with and passes through ears $g^2$ and $g^3$, projecting from a side of the receptacle, on the lower one of which it bears at its shoulder $x'$. The ears $g^2$ and $g^3$ are open on corresponding sides, as shown of the ear $g^3$ at $t$ in Fig. 2, to permit the head C, with the parts carried by it, including the rod D', to be swung on the rod D as their hinge-support away from the receptacle A when desired, as hereinafter described, and to fasten the cylinder to the rod D', I provide the set-screws $m'$ and $m^2$ to pass through the ears $g^2$ and $g^3$.

F and F' are drive-belts for the pulleys on the shaft $l^3$, one of the belts being crossed and both being connected with a suitable motor. (Not shown.)

For reversing the stroke of the plunger B, I provide belt-shifting mechanism, of which the following is a description: G is a bar supported to slide horizontally in bearings on an upper extension C' of the head C and carrying pairs of fingers $ff$ and $f'f'$, respectively flanking the belts F and F'. To the upper end of the extension C' is fulcrumed at one extremity a bell-crank-shaped lever $d$, having a slot $d'$ in its opposite extremity, at which it engages with a stud $d^2$, projecting from the bar G. At the angle of the lever $d$ it is pivotally connected with a vertical bar $c$, having a head $c'$ at its lower end, containing guide-slots $c^2$, engaged by studs $c^3$, projecting from the head extension C', the bar $c$ having an upper bracket-shaped extension $c^4$, in which is fastened to depend vertically a rod $b$, terminating at its opposite ends in heads $b'$ and $b^2$, both of which project into the path of a striker-arm $a$, projecting laterally from the upper end of the plunger-stem.

The operation is as follows: With the plunger at one end of its stroke and the other parts of the machine in the relative positions in which they are shown and with the supply of odor-impregnated grease and alcohol in the cylinder A the motor is actuated to drive the shaft $l^3$ through the medium of the belts and pulleys by turning the gear $l'$ and nut $l$ to move the stem B' vertically. When the plunger B reaches the end of either stroke, one or the other of the heads $b'$ $b^2$ on the rod $b$ is engaged by the striker-arm $a$ to turn the lever $d$ accordingly, and thereby slide the bar G in the direction to shift the belts on the drive-pulleys, and thereby reverse the stroke of the plunger. The movement of the plunger in each direction through the contents of the cylinder, which is steady and slow, forces the grease in strands as fine as the perforation $o$ through the latter, to which fine divisions of the grease the alcohol thus has access for taking up the odor, and by "working" the grease in this manner continuously for a suitably long period practically every particle thereof may eventually have been brought into contact with the alcohol-bath, with the effect of extracting every vestige of the odor.

For convenience in charging and evacuating the cylinder A all obstruction to convenient access thereto for these purposes may be readily removed by loosening the clamping-ring $p'$, then actuating the motor to cause the rise of the stem B' to raise the cover $p$ and lift out the plunger B, (after loosening and turning the arm $a$ out of the way,) thereupon loosening the set-screws $m'$ and $m^2$, and finally swinging the head C, with all the parts it carries, on its hinge or rod D away from the cylinder.

What I claim as new, and desire to secure by Letters Patent, is—

1. In a machine for working odor-impregnated grease in alcohol to extract the odor, the combination of a receptacle for the grease and alcohol carrying a support for the driving mechanism hinged at one side of said receptacle to swing in a horizontal plane, a plunger reciprocably confined in and closely fitting said receptacle and containing numerous perforations, and means for reciprocating the plunger to divide the grease into more or less fine strands, substantially as described.

2. In a machine for working odor-impregnated grease in alcohol to extract the odor, the combination of a receptacle for the grease and alcohol, a plunger reciprocably confined in and closely fitting said receptacle and containing numerous perforations, a threaded plunger-stem geared with suitable driving mechanism for reciprocating the plunger to divide the grease into more or less fine strands, and a support for said driving mechanism hinged to said receptacle and carrying means for removably fastening it against swinging to said receptacle, substantially as described.

3. In a machine for working odor-impregnated grease in alcohol to extract the odor, the combination of a receptacle for the grease and alcohol, a plunger reciprocably confined in and closely fitting said receptacle and containing numerous perforations, a plunger-stem carrying a striker-arm, a drive-shaft carrying pulleys equipped with straight and crossed belts and geared with said stem, and a belt-shifter comprising a sliding bar carrying fingers to engage said belts, a lever $d$ connected with said bar and a rod $b$ having a pivotal connection with said lever and carrying heads $b'$ and $b^2$ projecting into the path of said striker-arm, substantially as described.

4. In a machine for working odor-impregnated grease in alcohol to extract the odor, the combination of a receptacle for the grease and alcohol, a plunger reciprocably confined in and closely fitting said receptacle and containing numerous perforations, a plunger-stem having a threaded extension carrying a striker-arm, a nut confined about the threaded portion of the plunger and carrying the gear $l'$, a drive-shaft carrying the pinion $l^2$ meshing with said gear and the pulleys $h$, $h'$ and $h^2$ equipped with the belts F and F', and a belt-shifter comprising a sliding bar G carrying fingers $f$, $f'$, a lever $d$ connected with said bar, the bar $c$ pivotally connected with said lever and confined by guides limiting its movement, and a rod $b$ supported in vertical position on said bar $c$ and provided with the heads $b'$ and $b^2$ projecting into the path of said striker-arm, substantially as described.

5. In a machine for working odor-impregnated grease in alcohol to extract the odor, the combination of the cylinder A having projecting from its sides the perforated ears $g$, $g'$ and $g^2$, $g^3$, and provided with a removable cover $p$, a rod D supported in said ears $g$, $g'$, a head C supported on said rod and carrying a rod D' separably connected with said ears $g^2$, $g^3$, a plunger B reciprocably confined in and closely fitting said cylinder and containing numerous perforations, a plunger-stem B' having a threaded extension passing through said head; a nut $l$ confined in said head about the threaded portion of the plunger-stem and driving means geared with said nut to actuate it, substantially as described.

JAY LAHMER.

In presence of—
J. H. LEE,
R. T. SPENCER.